United States Patent
Yoneji et al.

(10) Patent No.: US 9,241,138 B2
(45) Date of Patent: Jan. 19, 2016

(54) IMAGE MONITORING APPARATUS, IMAGE MONITORING SYSTEM, AND IMAGE MONITORING SYSTEM CONFIGURATION METHOD

(71) Applicant: Hitachi, Ltd., Chiyoda-ku, Tokyo (JP)

(72) Inventors: Kenichi Yoneji, Kodaira (JP); Tomoaki Yoshinaga, Sagamihara (JP); Daisuke Matsubara, Koganei (JP); Tatsuhiko Kagehiro, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 13/748,231

(22) Filed: Jan. 23, 2013

(65) Prior Publication Data

US 2013/0208113 A1 Aug. 15, 2013

(30) Foreign Application Priority Data

Feb. 15, 2012 (JP) .................. 2012-030098

(51) Int. Cl.
*H04N 7/18* (2006.01)
*G08B 13/196* (2006.01)
*G06K 9/00* (2006.01)

(52) U.S. Cl.
CPC .............. *H04N 7/18* (2013.01); *G06K 9/00771* (2013.01); *G08B 13/19608* (2013.01); *G08B 13/19643* (2013.01); *H04N 7/181* (2013.01)

(58) Field of Classification Search
CPC ... H04N 7/18; H04N 7/181; G08B 13/19608; G08B 13/19643; G06K 9/00771
USPC ......................... 348/143, 152, 154
See application file for complete search history.

(56) References Cited

U.S. PATENT DOCUMENTS

| | | | |
|---|---|---|---|
| 5,657,076 A * | 8/1997 | Tapp | 348/154 |
| 6,456,320 B2 * | 9/2002 | Kuwano et al. | 348/143 |
| 6,724,421 B1 | 4/2004 | Glatt | |
| 2004/0263625 A1 | 12/2004 | Ishigami et al. | |
| 2006/0077262 A1 | 4/2006 | Miyamaki et al. | |

FOREIGN PATENT DOCUMENTS

| | | |
|---|---|---|
| JP | 8-265741 A | 10/1996 |
| JP | 2001-285849 A | 10/2001 |
| JP | 2004-343718 A | 12/2004 |
| JP | 2006-81125 A | 3/2006 |
| JP | 2008-236646 A | 10/2008 |

OTHER PUBLICATIONS

Zomet et al., "Seamless Image Stitching by Minimizing False Edges", IEEE Transactions on Image Processing, vol. 15, No. 4, Apr. 2006, pp. 969-977 (nine (9) sheets).
Japanese Office Action dated Jun. 16, 2015 with English-language translation (ten (10) pages).

* cited by examiner

*Primary Examiner* — Trang U Tran
(74) *Attorney, Agent, or Firm* — Crowell & Moring LLP

(57) ABSTRACT

An image monitoring technology for accurately collecting information about a monitoring target is provided. An image monitoring apparatus according to the present invention tracks the monitoring target on the basis of images sent from an overhead camera and images sent from gazing cameras, and switches gazing targets for the gazing cameras on the basis of the position and event information of the monitoring target, and tracking information about the monitoring target.

14 Claims, 15 Drawing Sheets

FIG. 7

| CONDITION | SCORE | | |
|---|---|---|---|
| | FACE GAZING FIELD | PERSON GAZING FIELD | TRACKING FIELD |
| DETECTION OF FACE | 10 | 3 | 0 |
| DETECTION OF MOTION | 3 | 5 | 0 |
| DISTANCE BETWEEN CAMERA AND TRACKING TARGET IS LESS THAN 2 m | -2 | -2 | 4 |
| DISTANCE BETWEEN CAMERA AND TRACKING TARGET IS EQUAL TO OR MORE THAN 2 m AND LESS THAN 6 m | 6 | 6 | 5 |
| DISTANCE BETWEEN CAMERA AND TRACKING TARGET IS EQUAL TO OR MORE THAN 6 m | 3 | 3 | 1 |
| CONGESTION DEGREE BROUGHT ABOUT BY PERSONS BETWEEN CAMERA AND TRACKING TARGET IS LOW | 2 | 2 | 2 |

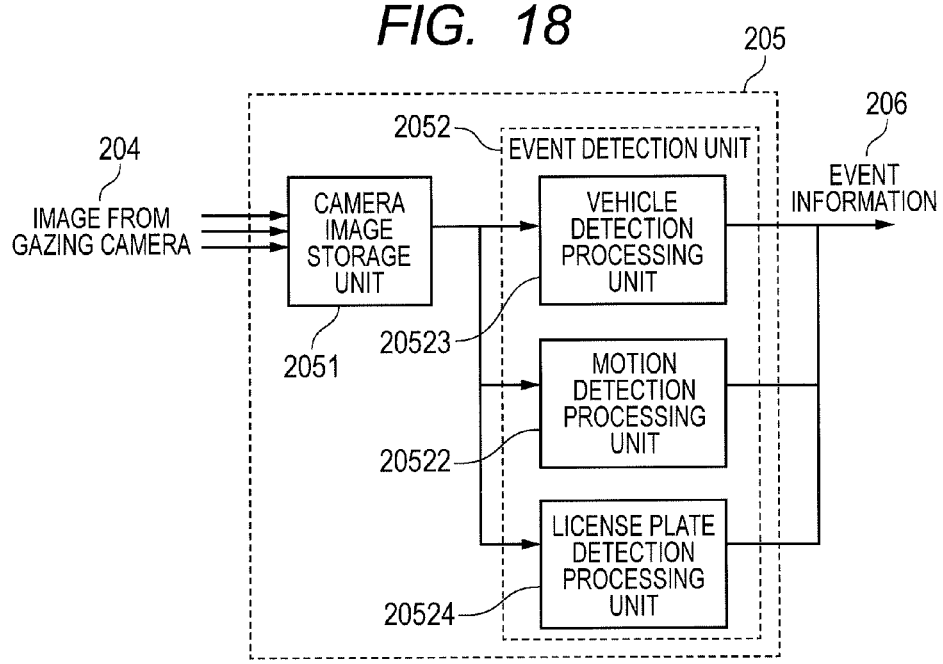

| CONDITION | SCORE | | |
|---|---|---|---|
| | LICENSE PLATE GAZING FIELD | VEHICLE GAZING FIELD | TRACKING FIELD |
| DETECTION OF VEHICLE | 5 | 5 | 0 |
| DETECTION OF MOTION | 3 | 3 | 0 |
| DETECTION OF LICENSE NUMBER | 10 | 4 | 0 |
| DISTANCE BETWEEN CAMERA AND TRACKING TARGET IS LESS THAN 2 m | -3 | -2 | 4 |
| DISTANCE BETWEEN CAMERA AND TRACKING TARGET IS EQUAL TO OR MORE THAN 2 m AND LESS THAN 10 m | 6 | 6 | 5 |
| DISTANCE BETWEEN CAMERA AND TRACKING TARGET IS EQUAL TO OR MORE THAN 10 m | 3 | 3 | 1 |
| CONGESTION DEGREE BROUGHT ABOUT BY VEHICLES BETWEEN CAMERA AND TRACKING TARGET IS LOW | 2 | 2 | 2 |

FIG. 21

| CONDITION | SCORE | | | | | | | | |
|---|---|---|---|---|---|---|---|---|---|
| | FACE GAZING FIELD | | PERSON GAZING FIELD | | | TRACKING FIELD | | |
| | NO PERSON TRACKING MODE | ONE PERSON TRACKING MODE | PLURAL PERSONS TRACKING MODE | NO PERSON TRACKING MODE | ONE PERSON TRACKING MODE | PLURAL PERSONS TRACKING MODE | NO PERSON TRACKING MODE | ONE PERSON TRACKING MODE | PLURAL PERSONS TRACKING MODE |
| DETECTION OF FACE | 10 | 10 | 5 | 9 | 3 | 6 | – | 0 | 3 |
| DETECTION OF MOTION | 0 | 3 | 2 | 0 | 5 | 2 | – | 0 | 0 |
| DISTANCE BETWEEN CAMERA AND NEAREST TRACKING TARGET IS LESS THAN 2 m | 0 | -2 | -2 | 0 | -2 | -2 | – | 4 | 9 |
| DISTANCE BETWEEN CAMERA AND NEAREST TRACKING TARGET IS EQUAL TO OR MORE THAN 2 m AND LESS THAN 6 m | 0 | 6 | 3 | 0 | 6 | 3 | – | 5 | 6 |
| DISTANCE BETWEEN CAMERA AND NEAREST TRACKING TARGET IS EQUAL TO OR MORE THAN 6 m | 0 | 3 | 1 | 0 | 3 | 1 | – | 1 | 3 |
| CONGESTION DEGREE BROUGHT ABOUT BY PERSONS BETWEEN CAMERA AND NEAREST TRACKING TARGET IS LOW | 0 | 2 | 4 | 0 | 2 | 7 | – | 2 | 8 |

700

IMAGE MONITORING APPARATUS, IMAGE MONITORING SYSTEM, AND IMAGE MONITORING SYSTEM CONFIGURATION METHOD

CLAIM OF PRIORITY

The present application claims priority from Japanese patent application JP 2012-030098 filed on Feb. 15, 2012, the content of which is hereby incorporated by reference into this application.

FIELD OF THE INVENTION

The present invention relates to a technology for monitoring targets with the use of images.

BACKGROUND OF THE INVENTION

Recently, the importance of security has come to be confirmed more and more with an increase in heinous crimes. Therefore, a number of monitoring cameras are installed in crowded places such as shopping areas and airports. Image information shot with these monitoring cameras are stored in storage devices such as monitoring recorders, and they are consulted as needed.

Japanese Unexamined Patent Application Publication No. Hei8 (1996)-265741 and Japanese Unexamined Patent Application Publication No. 2006-081125 disclose image monitoring systems equipped with plural monitoring cameras. In the image monitoring systems disclosed in these patent documents, in order to obtain detailed information about a specific monitoring target, the monitoring target is shot with a camera that has a narrow field of view angle but that is capable of shooting an image in detail and that is controlled to track the target on the basis of the image shot with a camera having a comparatively wide field of view angle.

SUMMARY OF THE INVENTION

It is desirable for an image monitoring system equipped with plural cameras to provide observers with as much information as possible. Plural monitoring cameras of an existing image monitoring system pay close attention to fixed targets respectively, and the plural monitoring cameras do not switch gazing targets among them, hence there is a possibility that the plural monitoring cameras provide redundant pieces of information. In addition, a switching process, in which, while a specific target is being tracked, a camera pays close attention to a target other than the specific target, cannot be performed. Therefore, even if there comes into being a new target to which close attention needs to be paid, there may be a possibility that any camera cannot switch its attention to the new target, which results in the loss of effective information.

The present invention was achieved to solve such problems as described above, and an object of the present invention is to provide an image monitoring technology that accurately collects information about a monitoring target.

An image monitoring apparatus according to the present invention tracks a monitoring target on the basis of images obtained from an overhead camera and obtained from gazing cameras, and switches gazing targets for the gazing cameras on the basis of the position and event information of the monitoring target and the tracking information about the monitoring target.

The image monitoring apparatus according to the present invention makes it possible that the gazing targets can be properly switched on the basis of the situation of the monitoring target.

BRIEF DESCRIPTION OF THE DRAWINGS

FIG. 7 is a diagram showing an example of a score per gazing target candidate table used when a gazing target appointment unit appoints a gazing target for a gazing camera;

FIG. 18 is a functional block diagram showing a configuration example of a gazing camera image analysis unit according to a fifth embodiment;

FIG. 19 is a diagram showing an example of a score per gazing target candidate table according to the fifth embodiment;

FIG. 21 is a diagram showing an example of a score per gazing target candidate table according to the sixth embodiment.

DETAILED DESCRIPTION OF THE PREFERRED EMBODIMENTS

First Embodiment

Figure 1:
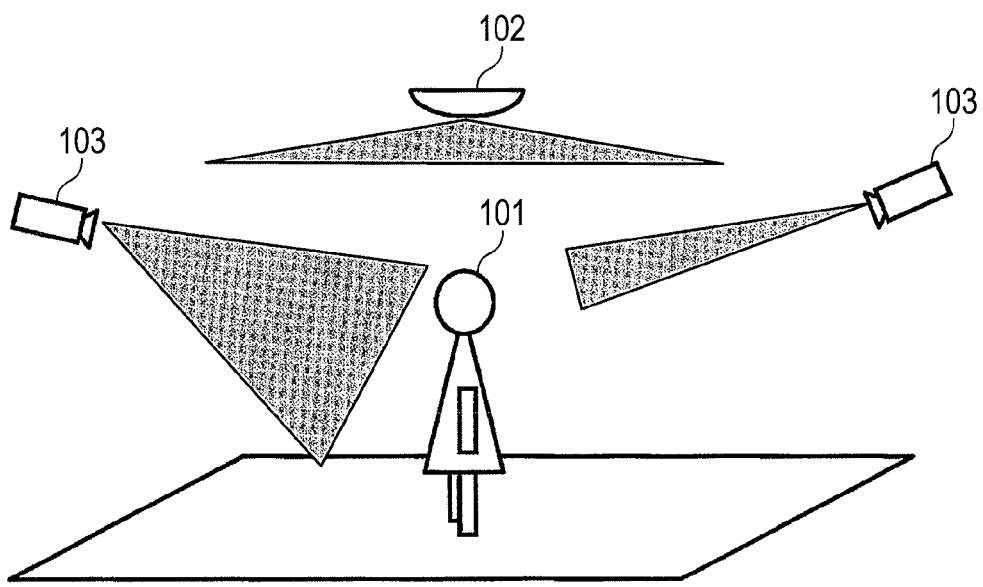
FIG. 1 is a schematic drawing showing a monitoring area that is a monitoring target of an image monitoring system according to a first embodiment.

FIG. 1 is a schematic drawing showing a monitoring area that is a monitoring target of an image monitoring system according to a first embodiment of the present invention. In FIG. 1, a monitoring target 101 in the monitoring area is monitored by an overhead camera 102 and gazing cameras 103.

The overhead camera 102 is a camera that is set up so as to shoot the wide range of the monitoring area (for example, the entirety of the monitoring area), and is capable of shooting an image of the entirety of the area viewed from up. The overhead camera 102 is set up, for example, on the ceiling over the center of a room, which has a little dead angle, with its lens directed to the floor of the room. In order to look down upon an area as widely as possible, a camera with a wide field of view, such as a fisheye camera or a wide-angle camera, is used. In the open air, because there is no ceiling, a camera is set up at the upper part of a building so that the entirety of a monitoring area, such as a road, can be shot by the camera.

A gazing camera 103 is a camera disposed to selectively shoot the face or clothes of the monitoring target 101. The gazing camera 103 is a camera whose depression angle, direction, and magnification are adjustable and whose observing point can be freely changed as well. Generally the shooting coverage of the gazing camera 103 is narrower than that of the overhead camera 102. However, there may be some exceptions depending on the specification of an individual gazing camera.

In the image monitoring system according to this first embodiment, the situation of the entirety of the monitoring area is grasped, and position information about the monitoring target is detected with the use of the overhead camera 102. Next, by controlling the gazing camera 103 using this position information, detailed information about the monitoring target is obtained. In other words, by controlling the gazing camera 103 with the use of the position information obtained from the overhead camera 102, information about the monitoring target can be effectively obtained.

Figure 2:
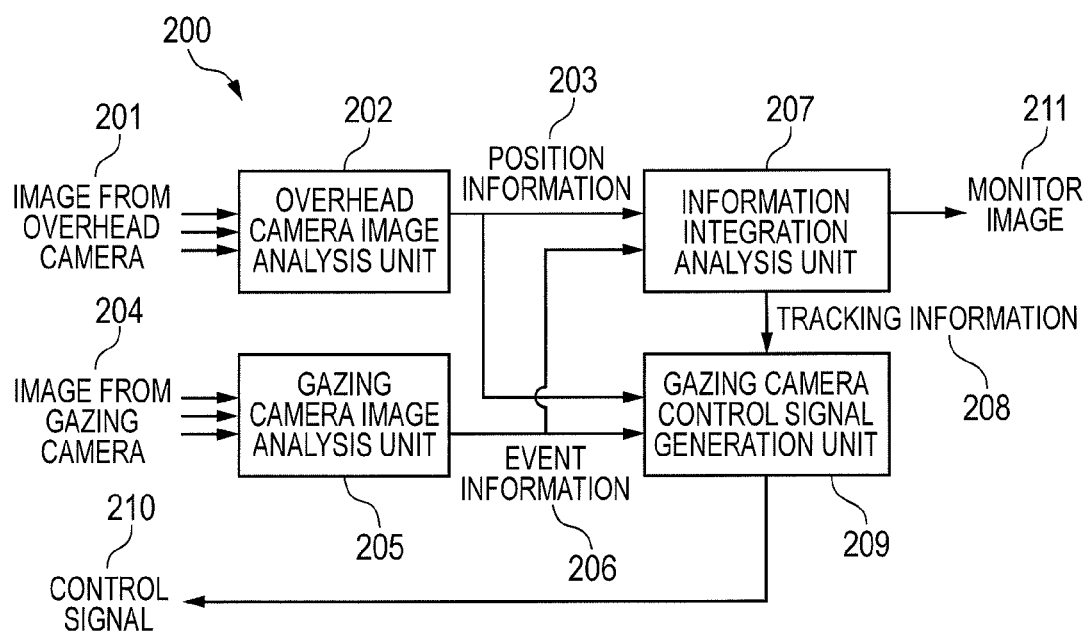
FIG. 2 is a functional block diagram of an image monitoring apparatus included by the image monitoring system according to the first embodiment.

FIG. 2 is a functional block diagram of an image monitoring apparatus 200 included by the image monitoring system according to this first embodiment. The image monitoring apparatus 200 includes an overhead camera image analysis unit 202, a gazing camera image analysis unit 205, an information integration analysis unit 207, and a gazing camera control signal generation unit 209.

The overhead camera image analysis unit 202 receives an image 201 captured by the overhead camera 102. If there are plural overhead cameras 102, the overhead camera image analysis unit 202 receives images captured by respective overhead cameras 102 one-by-one. The overhead camera image analysis unit 202 detects position information 203 of the monitoring target 101 on the basis of the input image 201. The position information 203 shows the location of the monitoring target 101 and position coordinate information about the location of a specific object to be monitored in the monitoring area.

The gazing camera image analysis unit 205 receives an image 204 captured by the gazing camera 103. If there are plural gazing cameras 103, the gazing camera image analysis unit 205 receives images captured by respective gazing cameras 103 one-by-one. The gazing camera image analysis unit 205 detects event information 206 showing the features of the monitoring target 101 from the image 204. The above-mentioned event information 206 is information that characterizes the monitoring target 101. In other words, if the monitoring target 101 is a person, the event information 206 is information that characterizes the person, for example the behavior, face, or the like of the person. What kinds of pieces of information are to be detected as the event information 206 can be set depending on an objective sought by an individual image monitoring system.

The information integration analysis unit 207 receives the position information 203 and the event information 206, and calculates tracking information 208 about the monitoring target 101 on the basis of the position information 203 and the event information 206. The tracking information 208 means a collection of pieces of information obtained about the monitoring target 101 at all the monitoring time points in the past, in which a piece of information at each monitoring time point includes information about the monitoring target 101 associated with each monitoring time point and tagged with a management number or the like. For example, if a specific person is tracked as the monitoring target 101, a collection of pieces of information about the position of the person, image information of the person's face, the person's movement locus, and the like, which have been obtained at all the monitoring time points in the past, is made to be the tracking information 208. The position and movement locus of the person are represented by a unified coordinate system in the real world (referred to as the real world coordinate system hereinafter). The information integration analysis unit 207 can track not only one specific target but also plural targets. For example, if the information integration analysis unit 207 detects and tracks only one specific person, the information integration analysis unit 207 has only to calculate the tracking information 208 about the specific person. On the other hand, if all persons who intrude a specific room need to be tracked, the tracking information 208 about all the persons has to be calculated.

The information integration analysis unit 207 generates a monitor image 211 that is displayed on a monitoring display described later in addition to the tracking information 208.

The gazing camera control signal generation unit 209 receives the position information 203, the event information 206, and the tracking information 208. The gazing camera control signal generation unit 209 generates a control signal 210 that is used for controlling the depression angle, direction, and magnification of a gazing camera 103 on the basis of the input position information 203, the event information 206, and the tracking information 208, and sends out the control signal 210 to the gazing camera 103. The control signal 210 is a signal that is used for allocating a different gazing object to each gazing camera 103. For example, in the case where a certain tracking target needs to be tracked, if there are four gazing cameras 103 that are capturing the tracking target in their fields of view, the control signal 210 performs such a switching operation as allocating the shooting of the face of a person to a first gazing camera, the shooting of the entire image of the person to a second gazing camera, and the collection of information necessary to track the person (the person's clothes and the like) to the remaining two gazing cameras.

Figure 3:
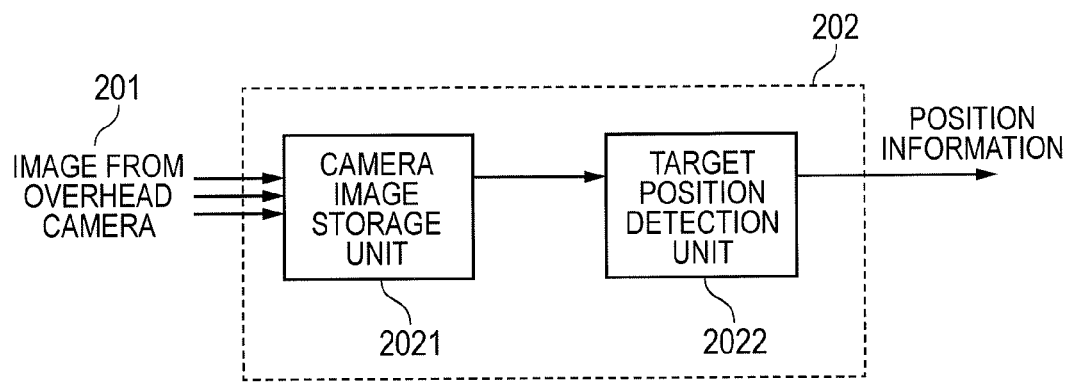
FIG. 3 is a functional block diagram showing a configuration example of an overhead camera image analysis unit.

FIG. 3 is a functional block diagram showing a configuration example of the overhead camera image analysis unit 202. The overhead camera image analysis unit 202 includes a camera image storage unit 2021 and a target position detection unit 2022.

The camera image storage unit 2021 receives an image 201 captured by the overhead camera 102, and associates the image 201 with the identifier of the overhead camera 102 that captured the image and the capture time, and stores the image.

The target position detection unit 2022 detects the position of the monitoring target 101 on the basis of the stored image. For example, if the head of a person is a detection target, the position of the detection target in the image can be pinpointed by performing template matching processing or the like which uses images of men's heads as templates. Because the pinpointed position is represented by coordinates in the coordinate system in the image, the coordinates are converted to coordinates in the real world coordinate system. This coordinate conversion can be easily performed by taking the installing condition of the overhead camera 102, shooting parameters, and the assumption that the size of man's head does not vary much depending on the man into consideration. In this case, any processing can be employed as long as the processing can detect the position of the monitoring target 101. In addition, the target to be detected is not necessarily a person. Any object that can be captured in the monitor image can be a detection target.

Figure 4:
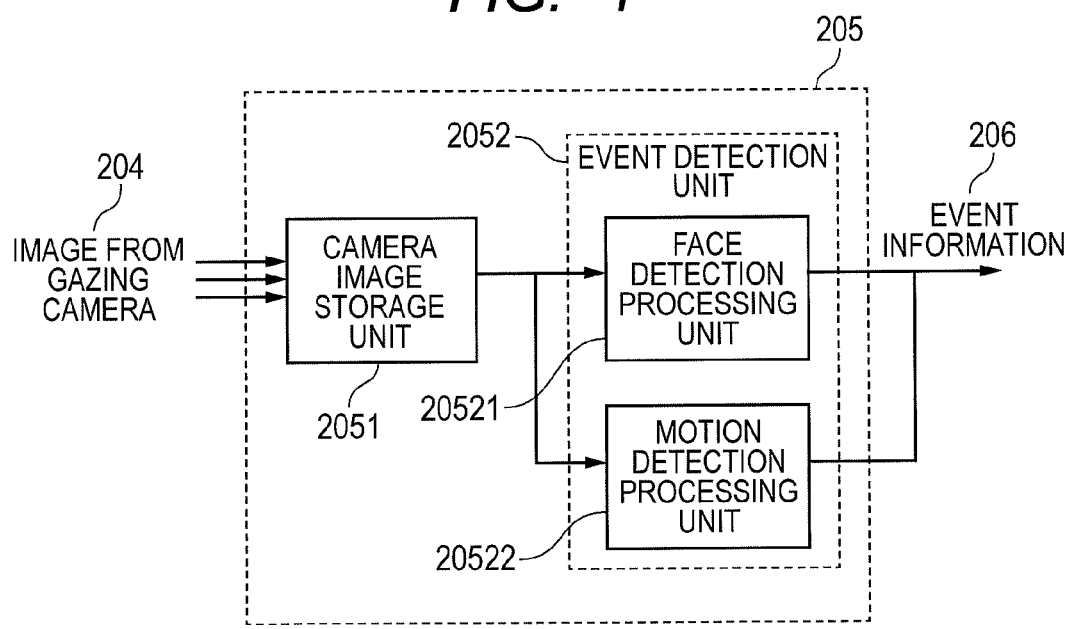
FIG. 4 is a functional block diagram showing a configuration example of a gazing camera image analysis unit.

FIG. 4 is a functional block diagram showing a configuration example of the gazing camera image analysis unit 205. The gazing camera image analysis unit 205 includes a camera image storage unit 2051 and an event detection unit 2052. In addition, the event detection unit 2052 includes a function unit for detecting the features of the monitoring target 101 as the even information 206. In this case, under the assumption that a monitoring object of the image monitoring system is a person, the image monitoring system including, for example, a face detection processing unit 20521 and a motion detection processing unit 20522 for detecting the face and motion of the person as the event information 206 will be described hereinafter, but the configuration of the event detection unit 2052 is not limited to the this configuration.

The camera image storage unit 2051 receives the image 204 captured by the gazing camera 103, and associates the image 204 with the identifier of the gazing camera 103 that captured the image and the capture time, and stores the image. The event detection unit 2052 detects the event information 206 on the basis of the stored image.

The face detection processing unit 20521 detects an area in which the face is captured in the image 204. For example, the area is detected by performing template matching processing or the like which uses images of men's faces as templates. The face detection processing unit 20521 outputs the detected area information, the face image, the identifier of the gazing camera 103 that captured the image, the capture time, and the like in gross as the event information 206.

The motion detection processing unit 20522 detects an area in which there is a motion from a shot image. For example, the motion detection processing unit 20522 calculates the difference between an image in the current frame and that in the previous frame shot by the same camera, and if there is a large difference in an area of the image, the area is detected as a motion area. The motion detection processing unit 20522 outputs the detected area information, the image of the motion area, the identifier of the gazing camera 103 that captured the image of the motion area, the capture time, and the like in gross as the event information 206.

Figure 5:
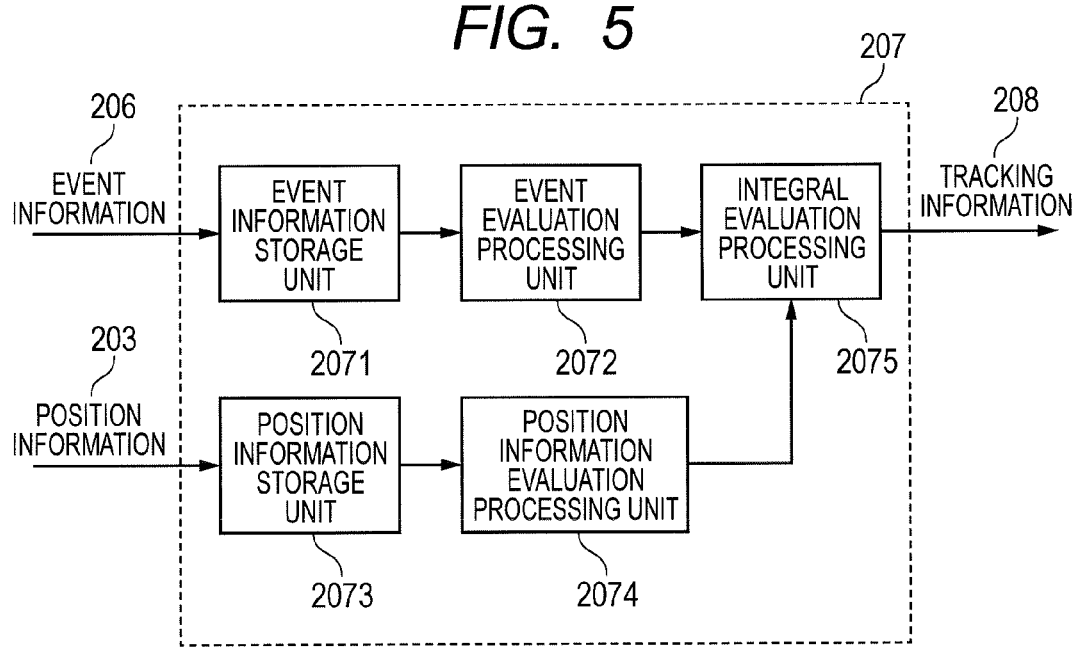
FIG. 5 is a functional block diagram showing a configuration example of an information integration analysis unit.

FIG. 5 is a functional block diagram showing a configuration example of the information integration analysis unit 207. The information integration analysis unit 207 includes an event information storage unit 2071, an event evaluation processing unit 2072, a position information storage unit 2073, a position information evaluation processing unit 2074, and an integral evaluation processing unit 2075.

The event information storage unit 2071 receives and stores the event information 206. The stored event information 206 is sequentially input into the event evaluation processing unit 2072. The event evaluation processing unit 2072 judges whether the input event information 206 is event information about a tracking target or not by comparing the event information 206 with the information about the tracking target. For example, if the face information about the tracking target is stored in advance, the event evaluation processing unit 2072 compares the face image with face image included in the input event information 206, and if these pieces of information are similar to each other, the event evaluation processing unit 2072 returns a high evaluation value, and if these pieces of information are not similar to each other, the event evaluation processing unit 2072 returns a low evaluation value. This comparison can be performed with the use of the absolute values of differences between the pixel values of the two face images.

The position information storage unit 2073 receives and stores the position information 203. The stored position information 203 is sequentially input to the position information evaluation processing unit 2074. The position information evaluation processing unit 2074 compares the position information 203 with the position information of the tracking target. For example, if the distance between the real world coordinates of the tracking target and those of the input position information 203 is short, the position information evaluation processing unit 2074 returns a high evaluation value.

The event evaluation processing unit 2072 and the position information evaluation processing unit 2074 need respectively initial event information and initial position information for tracking, and these pieces of information can be created on the basis of a certain kind of trigger information. For example, it is conceivable that an intrusion into a room by a person is taken as a trigger, the face image shot at the spot nearest to the entrance of the room when the intrusion occurs is taken as the initial event information, and the position information about the entrance of the room is taken as the initial position information.

The integral evaluation processing unit 2075 creates tracking information 208 about the tracking target with the use of the evaluation result of the event information 206 derived by the event evaluation processing unit 2072 and the evaluation result of the position information 203 derived by the position information evaluation processing unit 2074. For example, a position of the tracking target corresponding to the maximum of the evaluation result of the position information 203 and the evaluation result of the event information 206 can be taken as a new position of the tracking target. In this case, it is necessary to obtain the real world coordinates of the tracking target from the event information 206. For example, the area information of a face can be easily converted into an area in the real world coordinate system by taking a condition that the size of man's face does not vary much depending on the man and the like into consideration.

The integral evaluation processing unit 2075 can perform a similar piece of processing in the case of one tracking target and in the case of plural tracking targets. In the case where there are plural tracking targets, tracking information about all the tracking targets can be updated by performing the above-described evaluation processing and integral evaluation processing on all the tracking targets.

Figure 6:
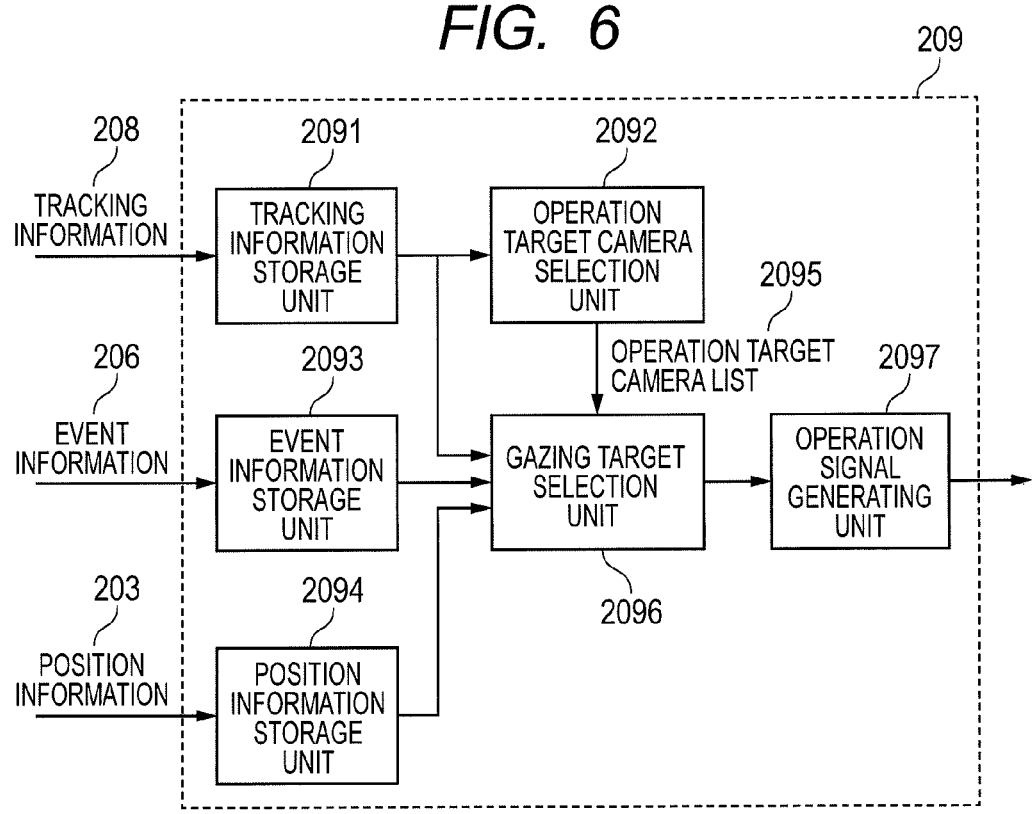
FIG. 6 is a functional block diagram showing a configuration example of a gazing camera control signal generation unit.

FIG. 6 is a functional block diagram showing a configuration example of the gazing camera control signal generation unit 209. The gazing camera control signal generation unit 209 includes a tracking information storage unit 2091, an operation target camera selection unit 2092, an event information storage unit 2093, a position information storage unit 2094, a gazing target selection unit 2096, and an operation signal generating unit 2097.

The tracking information storage unit 2091 receives and stores the tracking information 203. The operation target camera selection unit 2092 reads out the stored tracking information 203, and creates an operation target camera list 2095 on the basis of the read-out tracking information 203. For example, it is conceivable that the correlationship between the current position of the tracking target and a gazing camera 103 that is an operation target is determined in advance, or it is also conceivable that, after specifying gazing cameras 103 having their tracking targets in a shootable coverage on the basis of camera parameters, the operation target camera selection unit 2092 selects one out of the above specified gazing cameras 103 as an operation target.

The event information 206 and the position information 203 are input to and stored in the event information storage unit 2093 and the position information storage unit 2094 respectively. The stored tracking information 208, the event information 206, the position information 203, and the operation target camera list 2095 are input to the gazing target selection unit 2096.

The gazing target selection unit 2096 selects gazing targets for gazing cameras specified by the operation target camera list 2095 respectively. For example, the gazing target selection unit 2096 calculates an evaluation score for each gazing target candidate with the use of a score per gazing target candidate table 700, which is shown in FIG. 7 and will be described later, on the basis of the tracking information 208, the event information 206, and the position information 203 that are input to each gazing camera, and selects a candidate with the highest evaluation score as a gazing target for each gazing camera. Details about the above processing will be described later.

The operation signal generating unit 2097 generates an operation signal that directs each gazing camera 103 to gaze at the gazing target selected by the gazing target selection unit 2096. For example, in the case where a face is gazed at as a tracking target, the operation signal generating unit 2097 determines the direction and magnification of each gazing camera 103 on the basis of a position shown by the real world coordination system, further determines the depression angle of each gazing camera 103 so that the upper body of the tracking target may be shot, converts these pieces of information into an operation signal for each gazing camera 103, and sends out the operation signal to each gazing camera 103. In this case, it is conceivable that the direction of each gazing camera 103 is adjusted to the moving position of the tracking target by taking the speed of the gazing camera 103 into consideration. The moving position of the tracking target can be predicted with the use of linear prediction or the like on the basis of the movement locus shown by the tracking information 208.

FIG. 7 is a diagram showing an example of the score per gazing target candidate table 700 used when the gazing target selection unit 2096 selects a gazing target for a gazing camera 103. The score per gazing target candidate table 700 includes a condition field 701 and a score field 702.

The condition field 701 is a field where other pieces of environmental information which can be detected on the basis of the event information 206 detected by the gazing camera image analysis unit 205 and gazing camera images 204 are enumerated. In this first embodiment, because it is assumed that a person is tracked, conditions in the case where the face of the person and in the case where the motion of the person are enumerated as examples of pieces of event information 206. In addition, because the distance between a gazing camera 103 and a tracking target among environmental information that can be detected on the basis of gazing camera images 204 is an important piece of information to appoint a gazing target, it is enumerated in this field. In addition, in the case where there is an obstacle between a gazing camera 103 and a tracking target, the obstacle prevents the gazing camera 103 from gazing at the tracking target and causes the gazing target to be switched from the current target to another; hence one of such conditions is enumerated in this field. In this embodiment, although a congestion degree brought about by other persons is enumerated as an example of the above obstacle, it goes without saying that the above obstacle is not limited to this example.

The score field 702 is a field where evaluation scores indicating how conditions shown in the condition field 701 are respectively suitable for gazing target candidates are shown. The score field shows that higher an evaluation score for a gazing target is, the more suitable for the gazing target the corresponding condition is, and the priority of the gazing target becomes higher. In this embodiment, a face gazing evaluation score field 7021, a person gazing evaluation score field 7022, and a tracking evaluation score field 7023 are emulated as examples.

For example, if the gazing camera image analysis unit 205 detects the face of a person, because the gazing camera 103 is considered to be suitable for the purpose of gazing at the face, the evaluation score in the corresponding face gazing evaluation score field 7021 is set high. In addition, the evaluation scores are increased or decreased in accordance with distances between gazing cameras 103 and tracking targets. It is not necessarily more desirable that a tracking target should be nearer to a gazing camera 103; on the contrary, if the tracking target is too near to the gazing camera 103, it becomes difficult to shoot the tracking target. Therefore, concrete evaluation scores are different depending on individual gazing targets. Because the case where there are few obstacles, if any, between a gazing camera 103 and a tracking target is considered to be suitable for shooting the tracking target, the evaluation score for this case is increased.

The gazing target appointment unit 2096 sums up evaluation scores, which corresponds to condition fields 701 whose conditions coincide with the conditions of a gazing camera image 204, for each gazing target candidate shown in the score field 702, and selects a gazing target on the basis of the result. For example, priorities for gazing targets are determined in advance, and a gazing camera 103 that has the highest scores for a gazing target with the highest priority is adjusted to be trained on the gazing target. As a result, the above gazing target is selected as a gazing target for the above gazing camera 103. In a similar way, gazing targets are selected as the gazing targets for gazing cameras in the descending order of the priorities for the gazing targets. Alternatively, it is conceivable that the scores of the gazing targets respectively selected for the gazing cameras 103 are summed up, and this processing is performed about all the combinations of the gazing targets and the gazing cameras, and a combination of the gazing targets and the gazing cameras 103 that gives the largest total score is selected as the most suitable combination of the gazing targets and the gazing cameras 103.

The concrete contents of the condition field 701 is not limited to the contents exemplified in FIG. 7, and any information that can be judged from the tracking information 208, the event information 206, and the position information 203 can be used as environmental information. For example, when it comes to the condition "A congestion degree brought about by persons between a camera and a tracking target is low" shown in the sixth line, whether this condition is satisfied or not can be judged by obtaining a congestion degree between a gazing camera 103 and a tracking target on the tracking information 208 through examination of a congestion degree brought about by persons on the basis of the position information 203.

The tracking evaluation score field 7023 is a field prepared under the assumption that a gazing camera 103 is used in order to obtain information for tracking a tracking target. A gazing camera 103 with a high score in this field is used for obtaining information for tracking a tracking target. For example, by collecting information about the clothes and baggage of a tracking target and using this information, the tracking accuracy can be improved.

FIG. 7 shows an example of the score per gazing target candidate table 700, and the contents of the condition field 701 can be modified, the distribution of the scores can be modified, or the number of gazing target candidates can be increased. In addition, the method to select gazing targets is not limited to the above described one, and any method in which gazing targets can be distributed among gazing cameras 103 can be used.

Figure 8:
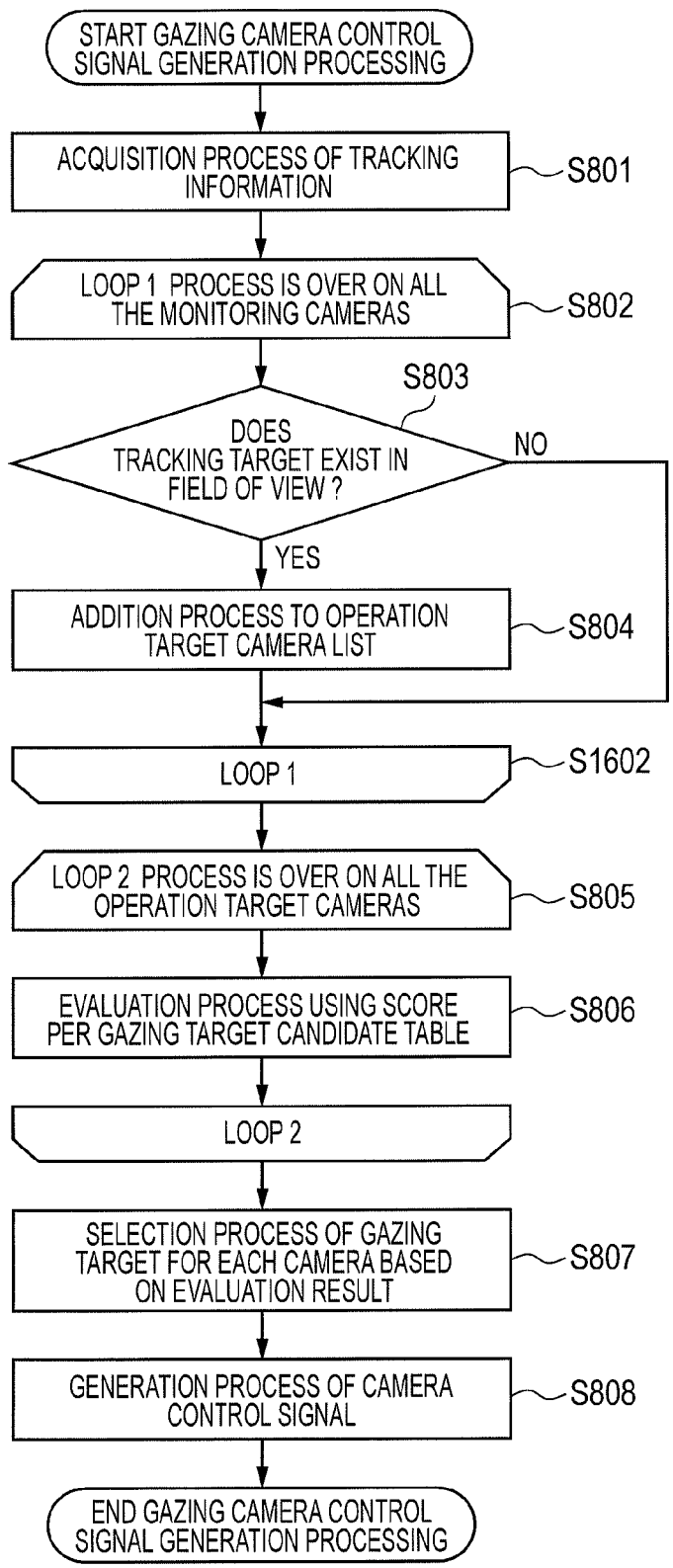
FIG. 8 is a process flowchart of the gazing camera control signal generation unit.

FIG. 8 is a process flowchart of the gazing camera control signal generation unit 209. Hereinafter, each step of FIG. 8 will be described.

(FIG. 8: Steps S801 and S802)

On acquiring tracking information 208 (at step S801), the gazing camera control signal generation unit 209 performs after-described steps S803 and S804 on all the gazing cameras (at step S802).

(FIG. 8: Steps S803 and S804)

The gazing camera control signal generation unit 209 judges whether a tracking target exists in the field of view of a gazing camera 103 or not (at step S803). If a tracking target exists in the field of view of the gazing camera 103, the gazing camera control signal generation unit 209 adds the identifier of the gazing camera 103 to the operation target camera list 2095 (at step S804).

(FIG. 8: Steps S805 and S806)

The gazing camera control signal generation unit 209 performs step S806 on all the gazing cameras 103 included in the operation target camera list 2095 (at step S805). The gazing camera control signal generation unit 209 evaluates a score for each gazing target candidate with the use of the score per gazing target candidate table 700 described with reference to FIG. 7.

(FIG. 8: Steps S807 and S808)

The gazing camera control signal generation unit 209 selects a gazing target for each gazing camera 103 on the basis of the evaluation result obtained at step S806 (at step S807). The gazing camera control signal generation unit 209 generates a control signal that directs each gazing camera 103 to gaze at the selected gazing target (at step S808).

Figure 9:
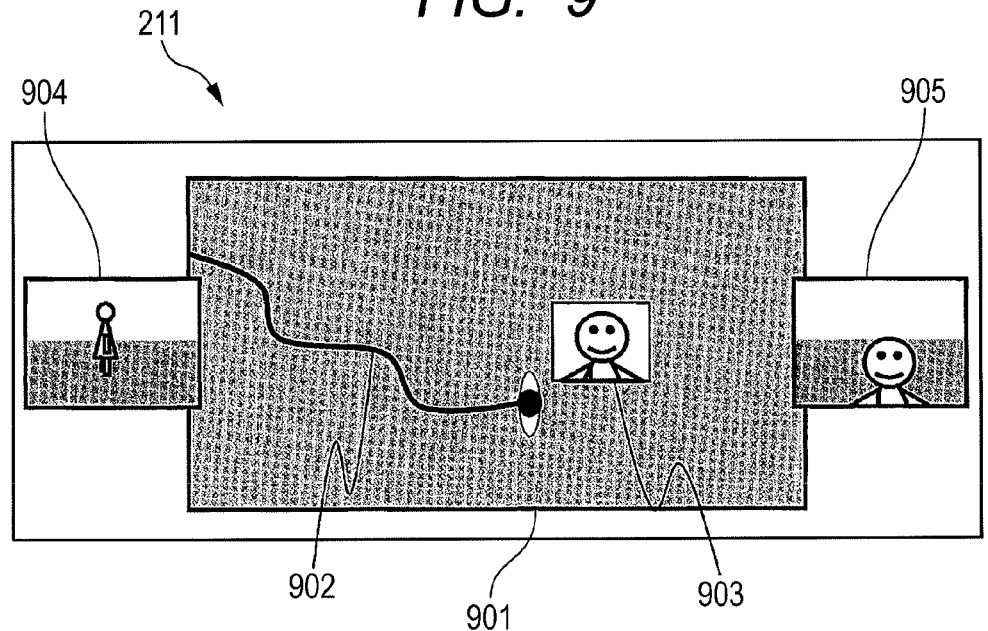
FIG. 9 is a diagram showing an example of a monitor image generated by the information integration analysis unit.

FIG. 9 is a diagram showing an example of a monitor image 211 generated by the information integration analysis unit 207. An overhead visual point image 901 is an image of a monitoring area viewed from up. The overhead visual point image 901 can be created by modifying images shot by plural overhead cameras and by joining the modified images. A movement locus 902 is a movement locus of a tracking target plotted on the corresponding positions on the overhead visual point image 901. A detailed image 903 is an image obtained by pasting, for example, the face image of a tracking target on the corresponding position on the overhead visual point image 901. A gazing camera image 904 and a gazing camera image 905 are images that are shot by two gazing cameras 103 respectively and displayed on the positions of the corresponding gazing cameras 103 on the overhead visual point image 901. By disposing each monitor image in such a way as shown in FIG. 9, an observer can intuitively obtain information about the tracking target person, and can effectively monitor the monitoring target.

Figure 10:
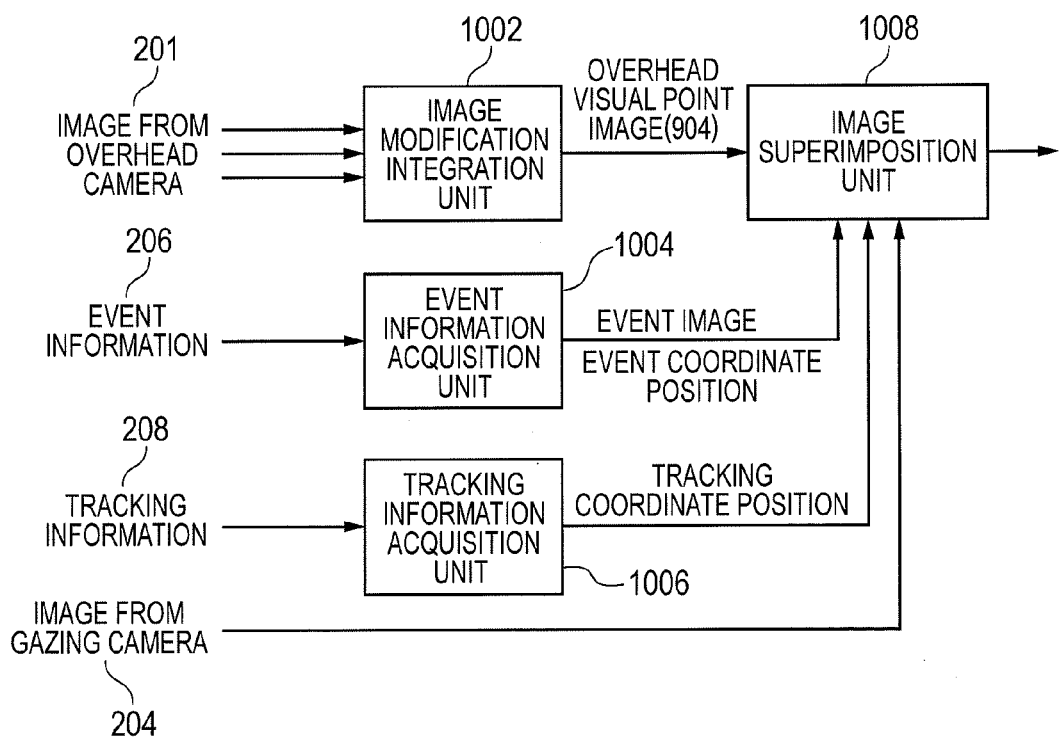
FIG. 10 is a functional block diagram for generating the monitor image.

FIG. 10 is a functional block diagram for generating the monitor image 211. Function units shown in FIG. 10 can be installed inside the information integration analysis unit 207, or it is conceivable that the function units are installed outside the information integration analysis unit 207 and the information integration analysis unit 207 provides only input information to the function units. Alternatively, an apparatus other the image monitoring apparatus 200 can be composed of the function units shown in FIG. 10.

An image modification integration unit 1002 receives overhead camera images 201. The image modification integration unit 1002 converts the overhead camera images 201 into an overhead visual point image 901, which is an image of the monitoring area viewed from up, by modifying the overhead camera images 201 and joining the modified overhead camera images 201. In this case, it is desirable to associate the coordinates on the overhead visual point image 901 with the real world coordinates. This association can be easily performed by obtaining origins of both coordinate systems, a rotation angle and a magnification between both coordinate systems in a similar way that a point on coordinates on the world coordinate system is converted into a point on coordinates on the overhead visual point image 901.

An event information acquisition unit 1004 acquires the event information 206. In this case, the coordinates on the real world coordinate system are converted into coordinates on the overhead visual point image 901. In addition, image areas including events corresponding to the event information 206 are cut out.

A tracking information acquisition unit 1006 acquires the tracking information 208. In this case, the coordinates of the tracking position on the real world coordinate system are converted into coordinates on the overhead visual point image 901.

An image superimposition unit 1008 superimposes various information pieces onto the overhead visual point image 901. For example, the event information 206 is displayed by pasting the clipping images on the coordinates where the events occur. The tracking information 208 is displayed by plotting points on the tracking coordinates. The gazing camera image 204 is displayed by superimposing the image on the coordinates where the gazing camera 103 is installed.

Figure 11:
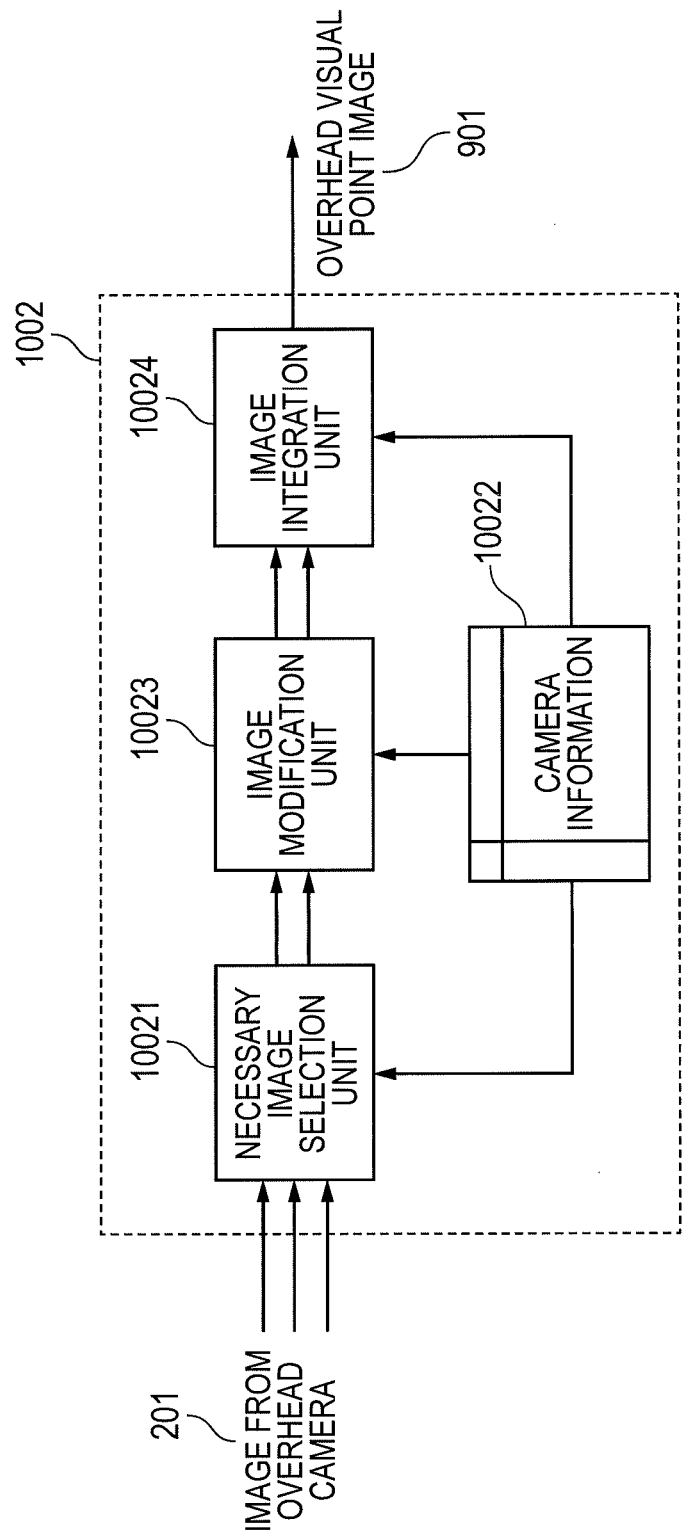
FIG. 11 is a functional block diagram showing a configuration example of an image modification integration unit.

FIG. 11 is a functional block diagram showing a configuration example of the image modification integration unit 1002. The image modification integration unit 1002 includes a necessary image selection unit 10021, camera information 10022, an image modification unit 10023, and an image integration unit 10024.

The camera information 10022 is information about parameters such as installation positions of cameras, angles of view, lens distortion factors, focal lengths, positional relations between cameras.

The necessary image selection unit 10021 obtains the overhead camera images 201. The necessary image selection unit 10021 selects camera images that need to be modified on the basis of the camera information 10022 prepared in advance (in this case, information about the installation positions and angles of view of the cameras). For example, if there are two cameras that have exactly the same shootable coverages, the necessary image selection unit 10021 selects one of the two cameras. The images shot by the selected camera are input to the image modification unit 10023.

The image modification unit 10023 modifies the input images into distortion-compensated images on the basis of the camera information 10022 (in this case, information about the lens distortion factors and the focal lengths of the cameras). To put it concretely, it is all right to make the modification so that the shapes of ground surfaces captured in the images may coincide with the corresponding shapes viewed from up that are depicted in the map. The modified images are input to the image integration unit 10024.

The image integration unit 10024 displaces the modified images in parallel to suitable positions respectively on the basis of the camera information 10022 (in this case, information about the positional relations between the cameras), and then joins the boundaries of the images as seamlessly as possible. When it comes to this joining processing, an image stitching technique used for creating panoramic images can be used. An example of image stitching techniques is disclosed in the reference literature 1.

(Reference literature 1) A. Zomet, A. Levin, S. Peleg, and Y. Weiss "Image Stitching by Minimizing False Edges", IEEE TRANSACTIONS ON IMAGE PROCESSING, VOL. 15, NO. 4, Apr. 2006.

Figure 12:
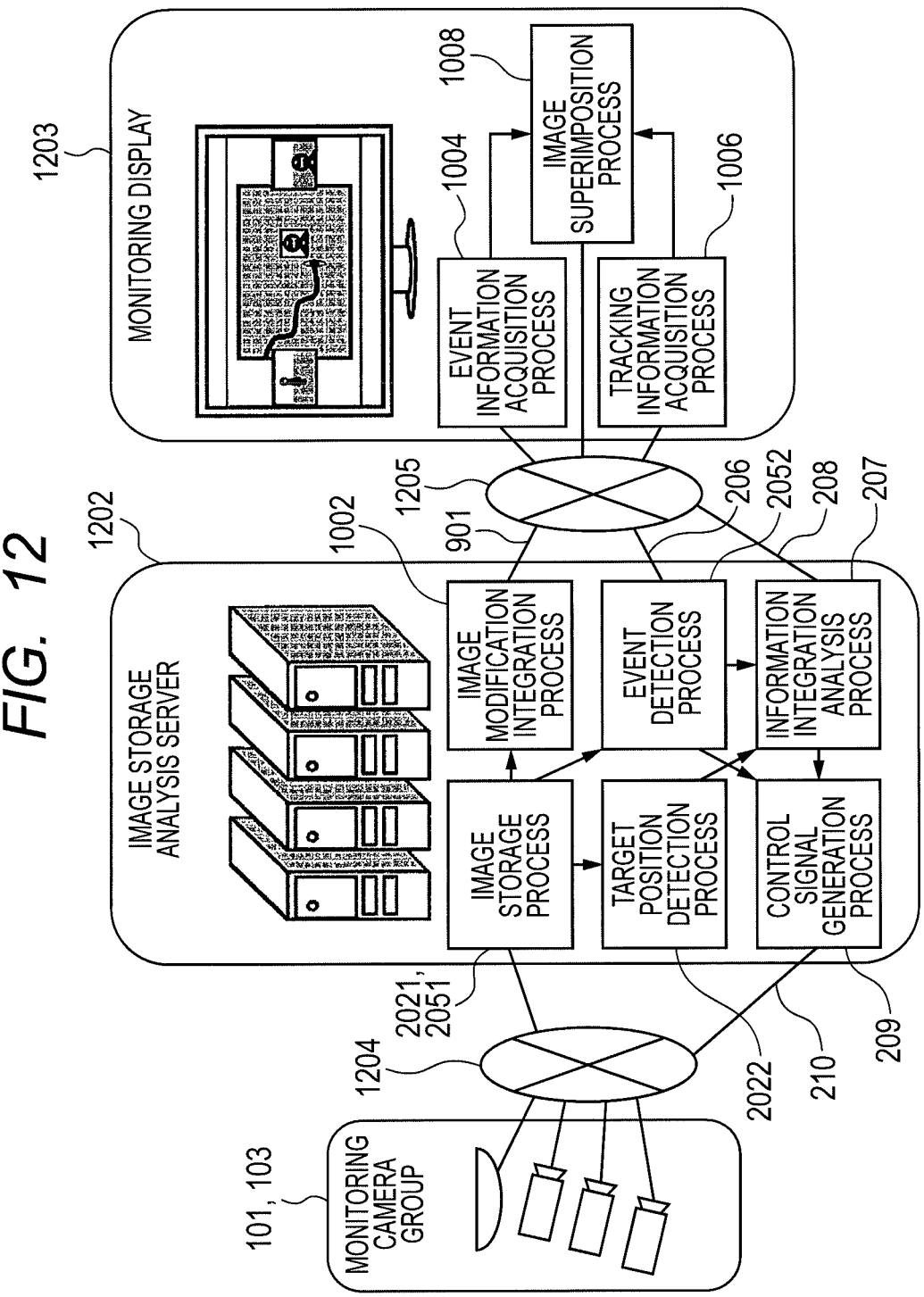
FIG. 12 is a diagram showing a configuration example of the image monitoring system according to the first embodiment.

FIG. 12 is a diagram showing a configuration example of the image monitoring system according to this first embodiment. The image monitoring apparatus 200 can be configured with an image storage analysis server 1202 and software in which various function units are implemented. The monitoring camera group including the overhead camera 101 and the gazing cameras 103 is connected to the image storage analysis server 1202 via a network 1204. A monitoring display 1203 is a display device for displaying the overhead visual point image 901, and is connected to the image storage analysis server 1202 via a network 1205.

Images from the monitoring camera group are input to the image storage analysis server 1202 via the network 1204. The image storage analysis server 1202 generates the gazing camera control signals 210, and sends the gazing camera control signals 210 to the gazing cameras 103 via the network 1204. The overhead visual point image 901, the event information 206, and the tracking information 208 are sent to the monitoring display 1203 via the network 1205. The monitoring display 1203 performs pieces of processing described with reference to FIG. 9 to FIG. 11, and creates and displays a monitor image 211 such as shown in FIG. 9.

Although FIG. 12 shows that the event detection processing and the image modification processing are performed in the image storage analysis server 1202, it is all right that these pieces of processing are performed in the cameras of the monitoring camera group. In addition, although the event acquisition processing, the tracking information acquisition processing, and the image superimposition processing are performed in the monitoring display 1203, these pieces of processing can be performed in the image storage analysis server 1202.

<First Embodiment: Conclusion>

As described above, in the image monitoring system according to this first embodiment, the gazing targets for the gazing cameras 103 are switched on the basis of the position information about the monitoring targets detected by the overhead camera 101. This makes it possible to effectively collect information about the monitoring targets.

In addition, the image monitoring system according to this first embodiment creates the overhead view point image 901 such as shown in FIG. 9 by modifying the overhead camera images 201 and the gazing camera images 204. Compared with the existing display method in which images shot by several cameras are simply displayed in plural display devices, the overhead view point image 901 makes it possible to easily monitor tracking targets because there is no need to watch dispersedly displayed plural pieces of information shot by several cameras about the tracking targets.

<Second Embodiment>

Figure 13:
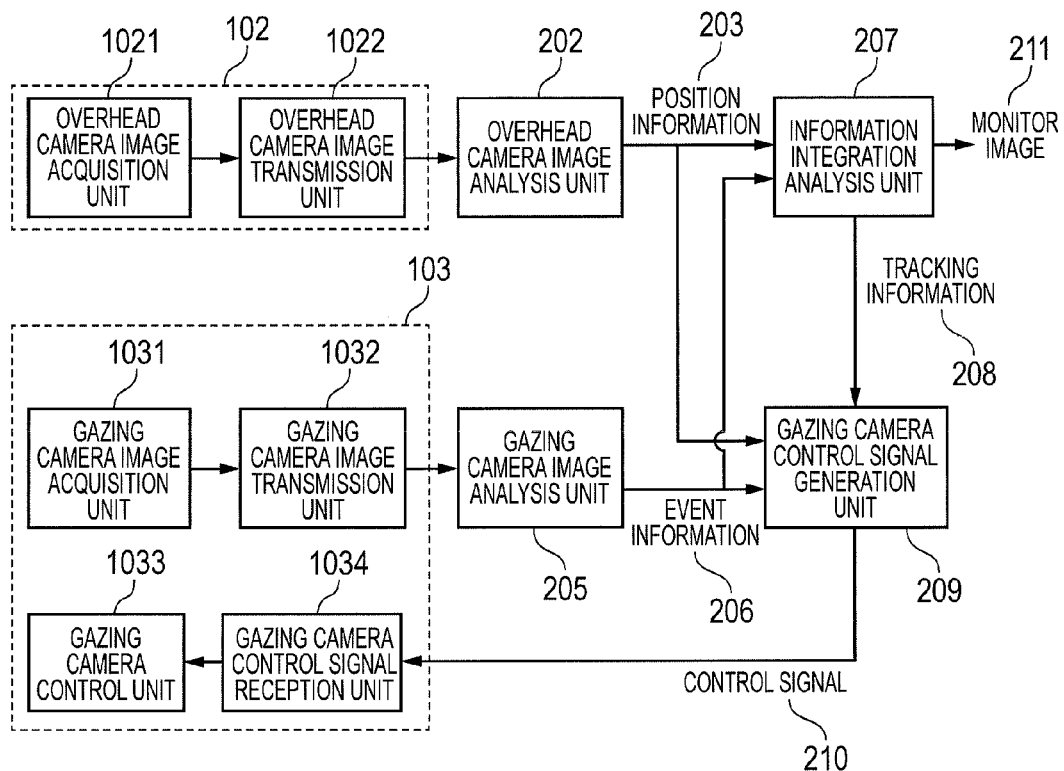
FIG. 13 is a functional block diagram of an image monitoring apparatus according to a second embodiment.

FIG. 13 is a functional block diagram of the image monitoring apparatus 200 according to a second embodiment of the present invention. In the second embodiment, an overhead camera 102 and a gazing camera 103 are integrally constructed with an image monitoring apparatus 200 in an all-in-one configuration. Because configurations other than the above are the same as those of the first embodiment, the differences between this second embodiment and the first embodiment will mainly be described hereinafter.

The overhead camera 102 includes an overhead camera image acquisition unit 1021 and an overhead camera image transmission unit 1022. The overhead camera image acquisition unit 1021 shoots an image. The overhead camera image transmission unit 1022 transmits the shot image to an overhead camera image analysis unit 202. For example, this transmission can be done via a network.

The gazing camera 103 includes a gazing camera image acquisition unit 1031, a gazing camera image transmission unit 1032, a gazing camera control signal reception unit 1034, and a gazing camera control unit 1033. The gazing camera image acquisition unit 1031 shoots an image, and the gazing camera image transmission unit 1032 transmits the shot image to a gazing camera image analysis unit 205. For example, this transmission can be done via a network.

A gazing camera control signal generation unit 209 outputs a control signal 210 to the gazing camera 103. The gazing camera control signal reception unit 1034 receives the control signal 210. The gazing camera control unit 1033 sets the gazing camera 103 so that the gazing camera 103 may have the direction, the depression angle, and the magnification that are instructed by the control signal 210.

<Third Embodiment>

In a third embodiment of the present invention, a method to configure the image monitoring system described in the first and second embodiments will be described from the viewpoint of procedures of disposing cameras. Image monitoring systems according to other embodiments can be configured in a way similar to that described hereinafter.

Figure 14:
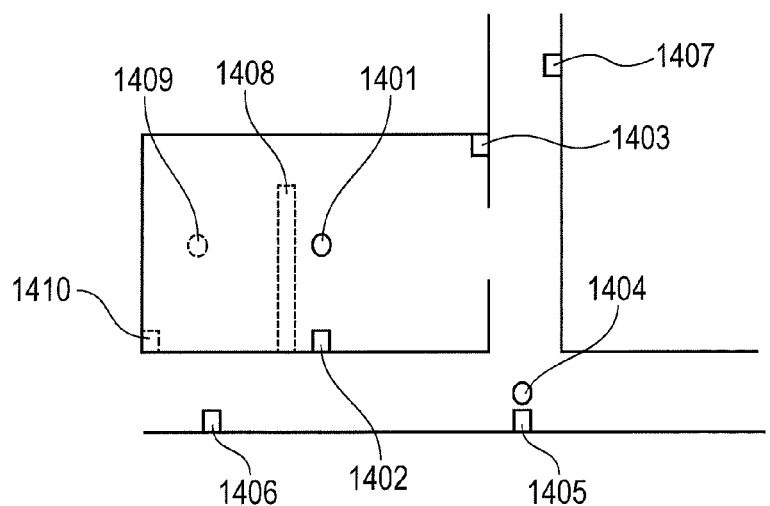
FIG. 14 is a diagram showing a map of a certain monitoring target area viewed from up and a disposition example of monitoring cameras.

FIG. 14 is a diagram showing a map of a certain monitoring target area viewed from up and a disposition example of monitoring cameras. Here, it will be assumed that the monitoring target area is located indoors. Hereinafter, procedures to dispose monitoring cameras over the monitoring target area shown in FIG. 14 will be described.

In the case where there is a room (a space with an area larger than a predefined area) in the monitoring area, an overhead camera is set at the center of the room (1401). It is desirable to dispose more than one gazing cameras 103 in the room in order to effectively monitor a target. A disposition example that two gazing cameras are disposed at a spot (1402) near to the center of the room and at a spot (1403) from which the entirety of the room can be easily surveyed is shown in this embodiment. With such a disposition of monitoring cameras as above, it becomes possible to survey all over the entirety of the room and to monitor various gazing targets.

Taking the fact that a corridor often brings about dead angles into consideration, an overhead camera 102 is preferentially disposed at an intersection or at a corner in order to eliminate dead angles (1404). On the same score, a gazing camera 103 is disposed at an intersection or at a corner (1405). In addition, with an aim to selectively monitor the flow of people or specific spots, gazing cameras 103 are disposed at constant intervals in a passageway (1406, 1407). The above disposition makes it possible to monitor various monitoring targets regardless of the traveling directions of the tracking targets. For example, it is conceivable that, in order to shoot the face of a tracking target, a gazing camera 103 situated ahead in the travelling direction of the tracking target is used, and that, in order to shoot the clothes of the tracking target, a gazing camera 103 situated in the opposite direction of the travel of the tracking target is used.

If, after the image monitoring system is started, an obstacle 1408 is disposed and the cameras disposed at the spots (1401, 1402) have dead angles, an overhead camera 102 is additionally disposed at a spot (1409) from which an area in the dead angle for the overhead camera (1401) can be surveyed, and a gazing camera 103 is also additionally disposed (1410). In this way, dead angles brought about after the system is started can be eliminated.

The above-described disposition method is only one example, and in reality the number of cameras installed and the disposition of the cameras vary depending on the installation environment of the cameras. For example, if the ceiling of a room in which cameras are to be installed is low, and it is difficult for an overhead camera 102 to monitor a wide area, it is necessary to install a little more number of overhead cameras 102. In addition, it is conceivable that gazing cameras 103 are installed only at an entrance of a building or in front of a door of a room where the flow of people is dense. In this way, it is desirable that cameras should be disposed taking the height of a ceiling or the flow of people into consideration.

Figure 15:
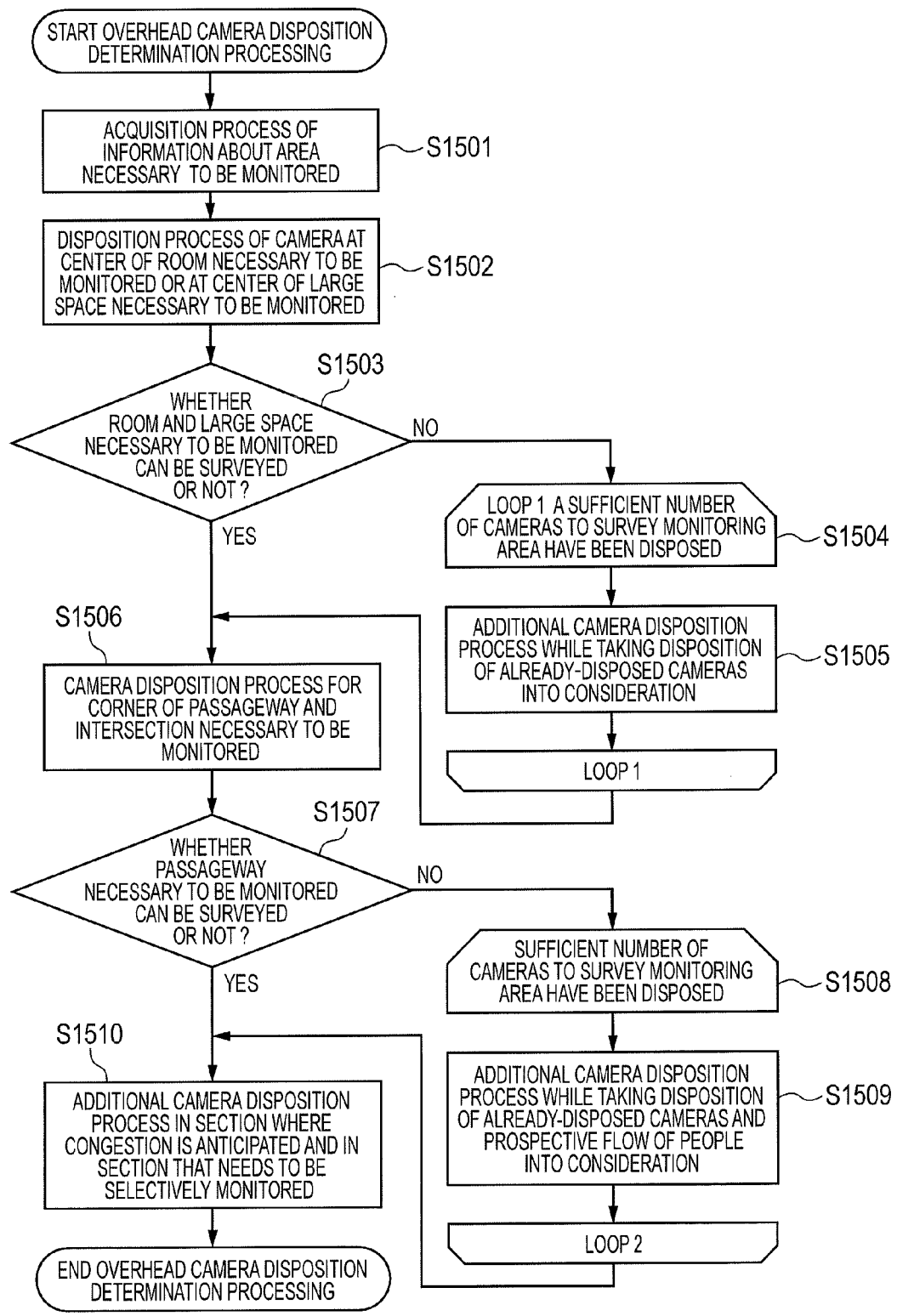
FIG. 15 is a flowchart for explaining the flow of disposition determination processing for disposing the overhead cameras described with reference to FIG. 14.

FIG. 15 is a flowchart for explaining the flow of the disposition determination processing of overhead cameras 102 described with reference to FIG. 14. First, information about an area necessary to be monitored is acquired (at step S1501). For example, information about the area of a room or the height of a ceiling of the room is acquired from the design drawing of the room. In addition, information about the prospective flow of people is acquired from information provided by a map or the like. Next, a camera is disposed at the center of a room necessary to be monitored or at the center of a large space necessary to be monitored (at step S1502). Next, with the use of information about the angles of view and focal lengths of the already-disposed cameras, and information about the area of a room necessary to be monitored and the height of a ceiling of the room, whether the room and the large space that are necessary to be monitored can be surveyed using the already-disposed cameras or not is judged (at step S1503). If it is judged that the room and the large space that are necessary to be monitored cannot be surveyed, the following pieces of processing are repeated until a sufficient number of cameras to survey the monitoring area have been disposed (at step S1504). In other words, taking the disposition of the already-disposed cameras into consideration, cameras that will be used for areas for which monitoring is currently not adequately performed are additionally disposed (at step S1505). Next, cameras are disposed for a corner of a passageway and an intersection that are necessary to be monitored (at step S1506). Next, it is judged whether a passageway necessary to be monitored can be surveyed with the use of the already-disposed cameras or not (at step S1507). If it is judged that the passageway necessary to be monitored cannot be surveyed, the following pieces of processing are repeated until a sufficient number of cameras to survey the monitoring area have been disposed (at step S1508). In other words, taking the disposition of the already-disposed cameras and the prospective flow of people into consideration, cameras that will be used for areas for which monitoring is currently not adequately performed are additionally disposed (at step S1509). Lastly, if necessary, cameras are additionally disposed in a section where congestion is anticipated and in a section that needs to be selectively monitored (at step S1510), and then the disposition determination processing for the overhead cameras is finished.

Figure 16:
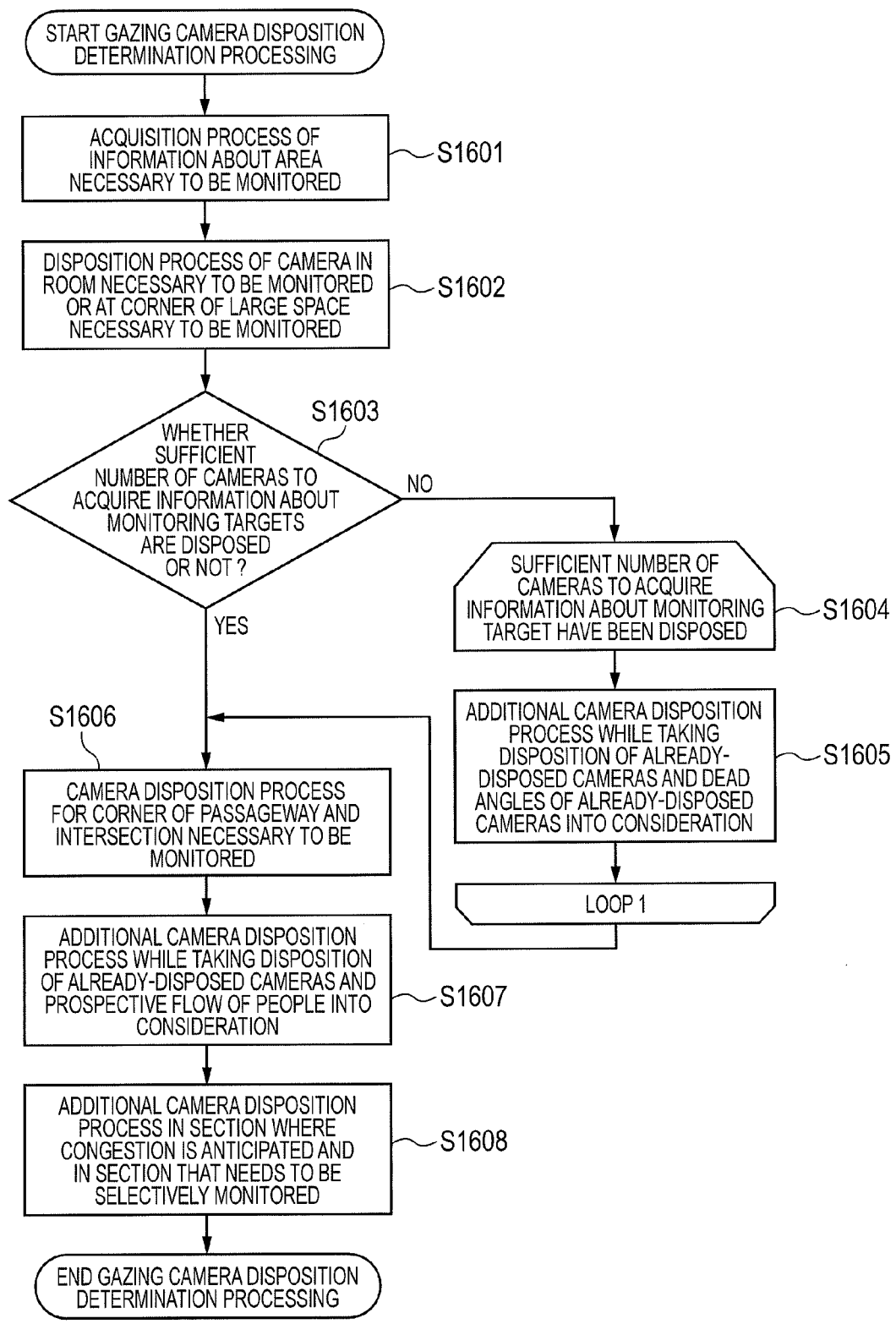
FIG. 16 is a flowchart for explaining the flow of disposition determination processing for disposing the gazing cameras described with reference to FIG. 14.

FIG. 16 is a flowchart for explaining the flow of disposition determination processing for disposing the gazing cameras described with reference to FIG. 14. First, information about an area necessary to be monitored is acquired (at step S1601). Next, a camera is disposed in a room necessary to be monitored or at a corner of a large space (at a corner of a comparted area) necessary to be monitored (at step S1602). Next, with the use of information about the angles of view and focal lengths of the already-disposed cameras, and information about the area of a room necessary to be monitored and the height of a ceiling of the room, whether a sufficient number of cameras to acquire information about monitoring targets are disposed or not is judged (at step S1603). For example, in the case where the face of a monitoring target needs to be securely captured, whether the cameras are disposed so that at least one of the cameras can capture the face of the monitoring target even if the face is turned toward any direction is judged. If it is judged that a sufficient number of cameras to acquire information about the monitoring target are not disposed, the following pieces of processing are repeated until a sufficient number of cameras to acquire information about the monitoring target have been disposed (at step S1604). In other words, taking the disposition of the already-disposed cameras and the dead angles of the already-disposed cameras into consideration, cameras that will be used for areas for which monitoring is currently not adequately performed are additionally disposed (at step S1605). Next, cameras are disposed for a corner of a passageway and an intersection that are necessary to be monitored (at step S1606). Next, taking the disposition of the already-disposed cameras and the prospective flow of people into consideration, cameras that will be used for areas for which monitoring is currently not adequately performed are additionally disposed (at step S1607). Lastly, if necessary, cameras are additionally disposed in a section where congestion is anticipated and in a section that needs to be selectively monitored (at step S1608), and then the disposition determination processing for the gazing cameras is finished.

In the determination of the disposition of the gazing cameras 103, the score per gazing target candidate table 700 described in the first embodiment can be used to determine the disposition of the gazing cameras. For example, it will be assumed that a monitoring target is located at a certain position in a monitoring target area, and that each of plural gazing cameras 103 is temporarily disposed at a position from which each gazing camera 103 can monitor the monitoring target. Subsequently, the gazing target is optimized for each gazing camera 103 in accordance with the procedures described in the first embodiment. At this time, an evaluation score for each gazing target candidate can be obtained. As similarly to the above processing, processing, in which it will be assumed that a monitoring target is located at another position in the monitoring target area and the position of each gazing camera 103 is determined, is repeated. Finally, the positions of the gazing cameras 103 are determined so that, even if the monitoring target is located anywhere, the number of gazing cameras 103 that earn evaluation scores equal to or more than a predefined threshold becomes equal to or more than a predefined number. The above processing, in which the position of a monitoring target is temporarily set and the positions of gazing cameras 103 are determined, can be automated as optimum solution searching processing with the use of an arbitrary optimization algorithm. This method can be used separately from the methods described with reference to FIG. 14 to FIG. 16, or can be used along with the methods.

<Third Embodiment: Conclusion>

As described above, in the method to configure an image monitoring system according to the third embodiment, the disposition of overhead cameras 102 and gazing cameras 103 can be optimally determined. Alternatively, with the use of the score per gazing target candidate table 700, it is possible to make a computer to automatically decide the disposition of the gazing cameras 103.

<Fourth Embodiment>

In a fourth embodiment of the present invention, a concrete example of the image superimposition unit 1008 that has been described in the first embodiment will be described. Other configurations are the same as those of the first embodiment to the third embodiment.

Figure 17:
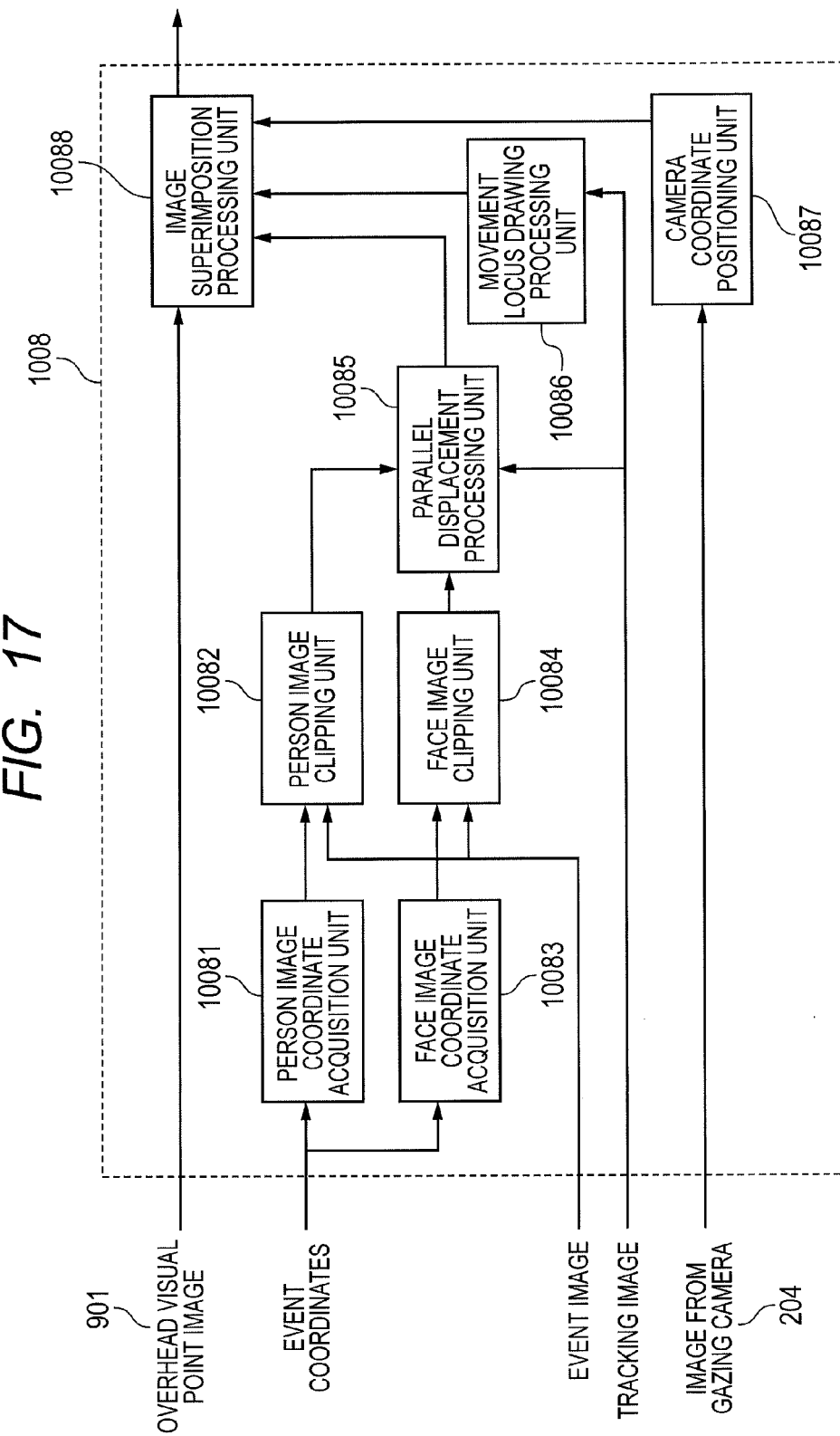
FIG. 17 is a functional block diagram showing a configuration example of an image superimposition unit.

FIG. 17 is a functional block diagram showing a configuration example of the image superimposition unit 1008. The image superimposition unit 1008 includes a person image coordinate acquisition unit 10081, a person image clipping unit 10082, a face image coordinate acquisition unit 10083, a face image clipping unit 10084, a parallel displacement processing unit 10085, a movement locus drawing processing unit 10086, a camera coordinate positioning unit 10087, and an image superimposition processing unit 10088.

The person image coordinate acquisition unit 10081 acquires the coordinate position of an area where a person event in an event image occurs. The person image clipping unit 10082 clips a person image in the event image with the use of the coordinate position of the area of the person image. The face image coordinate acquisition unit 10083 acquires the coordinate position of the area where a face event in the event image occurs. The face image clipping unit 10084 clips a face image in the event image with the use of the coordinate position of the area of the face image.

The parallel displacement processing unit 10085 displaces the clipping person image or face image in parallel to the current position of a tracking target with the use of tracking coordinates. The movement locus drawing processing unit 10086 draws the movement locus of the tracking target with the use of the tracking coordinates. For example, the movement locus drawing processing unit 10086 draws a point on the tracking coordinates at a certain time point and draws a line from this point to the tracking coordinates at the previous time point, which enables the movement locus to be drawn. The camera coordinate positioning unit 10087 displaces an input gazing camera image 204 in parallel to the position of the gazing camera 103 on an overhead view point image 901. The image superimposition processing unit 10088 displays superimposedly various event images that are clipped and displaced in parallel; the movement locus drawn by the movement locus drawing processing unit 10086; and the gazing camera image 204 that is displaced in parallel on the overhead view point image 901.

<Fourth Embodiment: Conclusion>

As described above, in the image monitoring system according to the fourth embodiment, because the most recent event images are always displayed near to the tracking target on the overhead view point image 901, the tracking target can be easily monitored.

<Fifth Embodiment>

In the first to fourth embodiments, the descriptions have been made under the assumption that a person is a monitoring target. In a fifth embodiment of the present invention, a configuration example in which a monitoring target is a vehicle instead of a person will be described. Because configurations other than the configuration associated with the change of the monitoring target are the same as those described in first to fourth embodiments, differences will be mainly described hereinafter.

FIG. 18 is a functional block diagram showing a configuration example of a gazing camera image analysis unit 205 according to the fifth embodiment. In this fifth embodiment, an event detection unit 2052 includes a vehicle detection processing unit 20523 instead of a face detection processing unit 20521; a vehicle detection processing unit 20523; and a license plate detection processing unit 20524. Other configurations are the same as those shown in FIG. 4.

The vehicle detection processing unit 20523 detects an area in which a vehicle is captured in a gazing camera image 204. For example, this process can be realized by performing template matching processing or the like in which images of vehicles are used as templates. The license plate detecting processing unit 20524 detects an area in which a license number is captured in the gazing camera image 204. For example, this process can be realized by performing template matching processing or the like in which several images of license plates are used as templates.

FIG. 19 is a diagram showing an example of a score per gazing target candidate table 700 according to this fifth embodiment. The general configuration of this table is similar to that shown in FIG. 7, but the contents of a condition field 701 of this table are modified in association with the change of the monitoring target from a person to a vehicle in order to be suited for this change. Because a gazing target for a vehicle is supposed to be the license plate of the vehicle or the entirety of the vehicle, the face gazing evaluation score field 7021 and the person gazing evaluation score field 7022 shown in FIG. 7 are respectively replaced with a license plate gazing evaluation score field 7024 and a vehicle gazing evaluation score field 7025. Evaluation scores for both face gazing evaluation score field 7021 and person gazing evaluation score field 7022 are also changed into evaluation scores for a license plate gazing evaluation score field 7024 and a vehicle gazing evaluation score field 7025.

<Fifth Embodiment: Conclusion>

As described above, the image monitoring system according to this fifth embodiment can provide an image monitoring system for monitoring vehicles in an outdoor environment. Although a vehicle has been cited as a target for the image monitoring method of this embodiment, a similar image monitoring method can be applied to the case where both vehicle and person are monitored in an outdoor environment. In addition, not only a vehicle and a person, but any object can be monitored with the use of an image monitoring method having a similar configuration as described above.

<Sixth Embodiment>

In a sixth embodiment of the present invention, the case where the image monitoring system described in any one of embodiments 1 to 5 has plural tracking modes will be described. A tracking mode is an operation mode to specify a method for tracking a monitoring target or monitoring targets. For example, with the use of one of the tracking modes, the number of persons who are tracked in parallel can be specified. In this sixth embodiment, as examples of tracking modes, three tracking modes will be described: (a) "no person tracking mode" in which a person is monitored but not tracked; (b) "one person tracking mode" in which a person is tracked; and (c) "plural persons tracking mode" in which plural persons are tracked. It will be assumed that these tracking modes are switched by some trigger.

Figure 20:
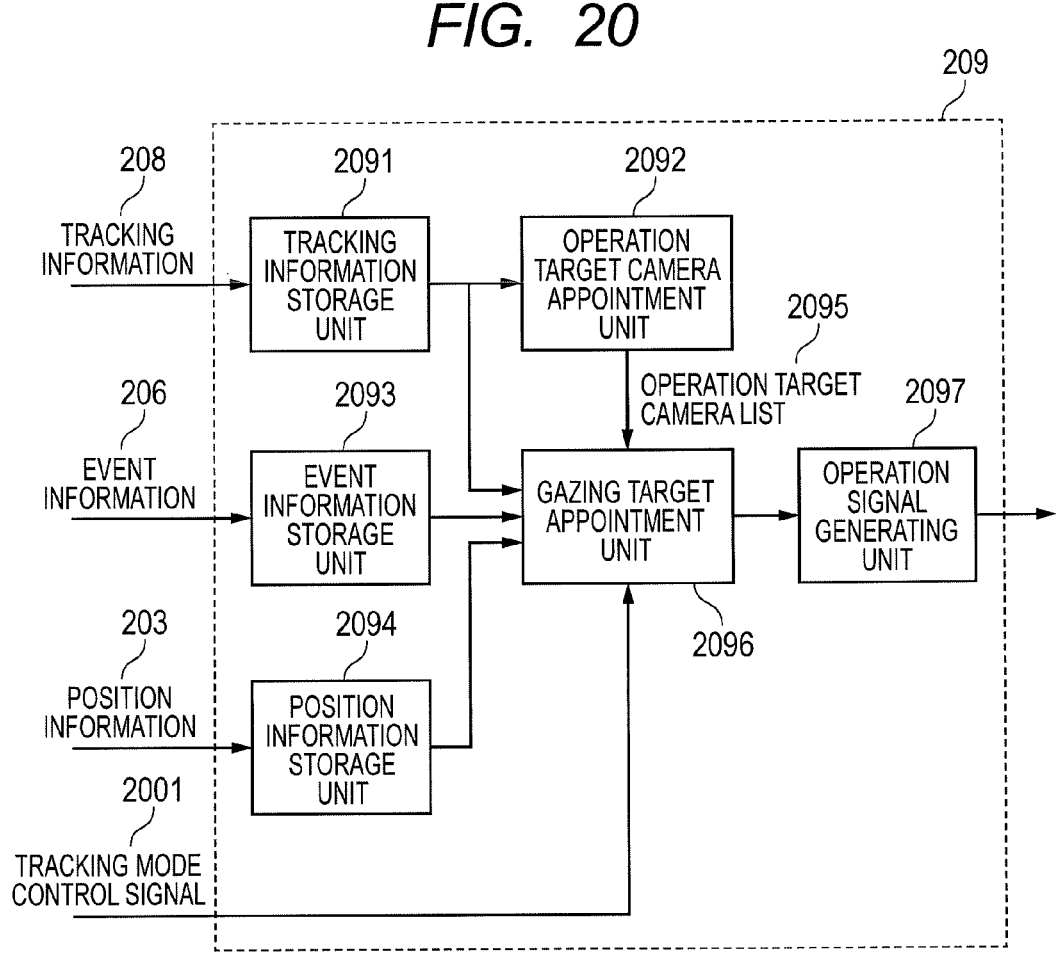
FIG. 20 is a functional block diagram showing a configuration example of a gazing camera control signal generating unit according to a sixth embodiment.

FIG. 20 is a functional block diagram showing a configuration example of a gazing camera control signal generating unit 209 according to a sixth embodiment. In this sixth embodiment, a gazing target appointment unit 2096 receives a tracking mode control signal 2001, and switches the tracking modes in accordance with directions of the tracking mode control signal 2001. The tracking mode control signal 2001 is a control signal issued on the basis of trigger information manually or automatically generated. Other configurations are similar to those of any of the first to fifth embodiments.

FIG. 21 is a diagram showing an example of a score per gazing target candidate table 700 according to this sixth embodiment. In this sixth embodiment, the score per gazing target candidate table 700 has a set of scores per tracking mode. Other contents of the score per gazing target candidate table 700 are similar to those of any of the first to fifth embodiments. The gazing target selection unit 2096 selects a gazing target for a gazing camera 103.

In the case where plural targets are tracked, by setting a tracking target that is the nearest to a camera as the gazing target to the camera, and by defining a score for the nearest tracking target under each condition, the plural targets can be tracked. In addition, in order that not only the nearest tracking target but also the second-nearest tracking target is made a gazing target candidate, it is all right that the face of the nearest person and the face of the second-nearest person are respectively set as gazing targets, for example, and scores are respectively prepared for condition fields of the nearest tracking target and the second-nearest tracking target.

<Sixth Embodiment: Conclusion>

As described above, in the image monitoring system according to this sixth embodiment, by preparing sets of scores for individual tracking modes, criteria of the evaluation for the gazing target candidates can be switched for individual tracking modes to perform the optimal camera control, and gazing targets can be optimally set for individual tracking modes.

The present invention is not limited to the above described embodiments, and various modifications of the present invention may be made. The above embodiments have been described in detail for explaining the present invention in an easily understood manner; therefore it is not always necessary that the present invention is configured with all the components of each embodiment. In addition, a part of configuration of a certain embodiment can be replaced with some component of another embodiment. In addition, some component of a certain embodiment can be added to the configuration of another embodiment. In addition, a part of configuration of each of the above described embodiments can be deleted.

All of or parts of the above described components, functions, processing units, and processing methods can be materialized by hardware with the use of integrated circuits or the like. Alternatively, the above described components, functions, and the like can be materialized by software in such a way that a processor interprets and executes programs that perform the workings of the above components, functions, and the like. The information about the programs, tables, files, and the like for materializing various functions and so on can be stored in recording devices such as memories, hard disks, and SSDs (solid state drives); and recording media such as IC cards, SD cards, and DVDs.

What is claimed is:

1. An image monitoring apparatus, comprising:
    an overhead camera image analysis unit that receives an image sent from at least one overhead camera that shoots a monitoring area, and detects position information of a monitoring target;
    a gazing camera image analysis unit that receives images sent from a plurality of gazing cameras that gaze at and shoot areas narrower than the area shot by the at least one overhead camera in the monitoring area, and detects event information that represents the features of the monitoring target;
    an information integration analysis unit that obtains tracking information about the monitoring target with the use of the position information detected by the overhead camera image analysis unit and the event information detected by the gazing camera image analysis unit; and
    a gazing camera control signal generation unit that generates control signals for switching gazing targets for the gazing cameras with the use of the position information detected by the overhead camera image analysis unit, the event information detected by the gazing camera image analysis unit, and the tracking information about the monitoring target, and sends the control signals to the gazing cameras respectively;
    wherein the gazing camera control signal generation unit includes
    a gazing target selection unit that selects a gazing target for each gazing camera by performing evaluation whether a gazing target candidate for each gazing camera is suitable for a gazing target for each gazing camera or not,
    wherein the gazing target selection unit
        performs the evaluation on the basis of the position information detected by the overhead camera image analysis unit, the event information detected by the gazing camera image analysis unit, and the tracking information about the monitoring target, and
        selects gazing targets suitable for all the gazing cameras respectively by comparing evaluation results for the gazing targets for all the gazing cameras respectively.

2. The image monitoring apparatus according to claim 1, wherein, if the event information detected by the gazing camera image analysis unit coincides with the event information associated with the candidate, the gazing camera control signal generation unit increases a priority for the candidate to be selected as a gazing target.

3. The image monitoring apparatus according to claim 1, wherein the information integration analysis unit calculates a distance between the monitoring target and each gazing camera as tracking information, and
wherein the gazing camera control signal generation unit increases or decreases a priority for the candidate to be selected as a gazing target for each gazing camera depending on the distance between the monitoring target and each gazing camera that is calculated by the information integration analysis unit, and a distance between the gazing target associated with the candidate and each gazing camera.

4. The image monitoring apparatus according to claim 1, wherein the gazing camera control signal generation unit increases or decreases a priority for a gazing target candidate to be selected as a gazing target for each gazing camera depending on whether there is an obstacle between each gazing camera and the monitoring target or not.

5. The image monitoring apparatus according to claim 1, wherein the gazing camera control signal generation unit determines gazing targets for a plurality of gazing cameras respectively so that a total of the evaluation results for the plurality of gazing cameras may be maximized.

6. The image monitoring apparatus according to claim 1, wherein the gazing camera image analysis unit detects the face of a person or the motion of the person as the event information.

7. The image monitoring apparatus according to claim 1, wherein the gazing camera image analysis unit detects the presence or absence of a vehicle, the license plate of the vehicle, or the motion of the vehicle as the event information.

8. The image monitoring apparatus according to claim 1, wherein the gazing camera control signal generation unit receives a control signal indicating that a tracking mode to specify a technique for tracking the monitoring target needs to be switched, and changes the criterion for the evaluation in accordance with the technique specified by the tracking mode indicated by the control signal.

9. An image monitoring system comprising:
the image monitoring apparatus according to claim 1;
at least one overhead camera that shoots the entirety of the monitoring area; and
a plurality of gazing cameras that gaze at and shoot areas narrower than the area shot by the at least one overhead camera in the monitoring area.

10. A configuration method for configure the image monitoring system according to claim 9 in the case where a plurality of gazing cameras are used, comprising:
an overhead camera disposing step that decides the disposition of the plurality of overhead cameras in the monitoring area;
a gazing camera disposing step that decides the disposition of the plurality of gazing cameras in the monitoring area,
wherein the overhead camera disposing step includes:
obtaining information about the spread and height of the monitoring area;
disposing an overhead camera at the center of a space having a spread more than a predetermined area in the monitoring area;
disposing an overhead camera at a corner of a street or an intersection that needs to be monitored in the monitoring area;
additionally disposing a sufficient number of overhead cameras to survey the monitoring area without omission on the basis of the obtained information about the spread and height and the disposition of the already-disposed overhead cameras, and
additionally disposing overhead cameras in a section where congestion is anticipated and in a section that needs to be selectively monitored in the monitoring area.

11. The configuration method for configuring the image monitoring system according to claim 10,
wherein the gazing camera disposing step includes:
obtaining information about the spread and height of the monitoring area;
disposing a gazing camera at a corner of a comparted space in the monitoring area;
disposing gazing cameras at a corner of a street and an intersection that need to be monitored in the monitoring area;
additionally disposing a sufficient number of gazing cameras to survey the monitoring targets without omission on the basis of the obtained information about the spread and height and the disposition of the already-disposed gazing cameras, and
additionally disposing gazing cameras in a section where congestion is anticipated and in a section that needs to be selectively monitored in the monitoring area.

12. The configuration method for configuring the image monitoring system according to claim 10,
wherein the gazing camera disposing step further includes:
performing evaluation whether a gazing target candidate for each gazing camera is suitable for a gazing target for each gazing camera or not under the assumption that the monitoring target is located at a certain position in the monitoring area, and
determining the disposition of the gazing cameras so that the number of gazing cameras whose evaluation results are lower than a predetermined threshold is less than a predetermined number.

13. An image monitoring apparatus, comprising:
an overhead camera image analysis unit that receives an image sent from at least one overhead camera that shoots a monitoring area, and detects position information of a monitoring target;
a gazing camera image analysis unit that receives images sent from a plurality of gazing cameras that gaze at and shoot areas narrower than the area shot by the at least one overhead camera in the monitoring area, and detects event information that represents the features of the monitoring target;
an information integration analysis unit that obtains tracking information about the monitoring target with the use of the position information detected by the overhead camera image analysis unit and the event information detected by the gazing camera image analysis unit;
a gazing camera control signal generation unit that generates control signals for switching gazing targets for the gazing cameras with the use of the position information detected by the overhead camera image analysis unit, the event information detected by the gazing camera image analysis unit, and the tracking information about the monitoring target, and sends the control signals to the gazing cameras respectively;
an image modification integration unit that receives images sent from a plurality of overhead cameras in the case where the plurality of overhead cameras are used, and modifies the images to a visual point image of the monitoring area viewed from up;
an image superimposition unit that superimposes the event information detected by the gazing camera image analysis unit, tracking information about the monitoring target, and images shot by the gazing cameras onto the visual point image; and
an output unit that outputs the image created by the image superimposition unit.

14. The image monitoring apparatus according to claim 13, wherein the event information of the gazing cameras is superimposed onto an overhead visual point image after the event information of the gazing cameras is displaced in parallel using tracking information.

* * * * *